United States Patent
Wössner et al.

[11] 3,833,248
[45] Sept. 3, 1974

[54] SHOCK-ABSORBING BUMPER ARRANGEMENT

[75] Inventors: Felix Wössner; German Schmitt, both of Schweinfurt am Main, Germany

[73] Assignee: Fichtel & Sachs AG, Schweinfurt, Germany

[22] Filed: May 9, 1972

[21] Appl. No.: 251,813

[30] Foreign Application Priority Data
May 15, 1971 Germany............................ 2124275
May 15, 1971 Germany............................ 2124276

[52] U.S. Cl............ 293/86, 293/DIG. 2, 267/64 R, 188/282
[51] Int. Cl...................... B60r 19/06, F16f 9/06
[58] Field of Search............ 293/70, 85, 86, DIG. 2; 188/282, 117; 267/64 R; 287/53 TK

[56] References Cited
UNITED STATES PATENTS

| | | | |
|---|---|---|---|
| 1,296,042 | 3/1919 | Bralove............................ | 287/53 TK |
| 1,448,229 | 3/1923 | Miller et al. ........................ | 188/282 |
| 2,600,060 | 6/1952 | Lopes et al. ............................ | 293/85 |
| 2,997,291 | 8/1961 | Stultz.................................. | 188/317 |
| 3,316,558 | 5/1967 | Mortensen......................... | 267/64 R |
| 3,444,965 | 5/1969 | Dobkins............................. | 188/282 |
| 3,516,520 | 6/1970 | Agren et al. ......................... | 188/282 |

Primary Examiner—M. Henson Wood, Jr.
Assistant Examiner—Robert Saifer
Attorney, Agent, or Firm—Hans Berman

[57] ABSTRACT

Telescoping shock absorbers are arranged between the frame and bumper bar of an automotive vehicle in such a manner that the piston of each shock absorber moves inward of the cylinder under the impact of a collision, and liquid flows through a restricted passage between the compartments of the cylinder cavity to reduce the velocity of cylinder movement. If the passage is a groove in the inner cylinder wall, its flow section decreases in the direction of inward piston movement in such a manner that the force opposing the piston movement remains substantially constant even though the velocity of cylinder movement decreases. The same result can be achieved by forming the restricted passage in the piston, and biasing a valve member on the piston toward the passage closing position by a heavily prestressed cup spring or helical spring.

7 Claims, 20 Drawing Figures

SHOCK-ABSORBING BUMPER ARRANGEMENT

This invention relates to the protection of vehicles against collision, and particularly to a vehicle equipped with a bumper or bumpers.

Bumpers currently supplied to passenger automobiles absorb the impact of a collision by undergoing plastic deformation, but their resistance to such deformation is so small as to be negligible at collision speeds of even less than 5 MPH so that practically the full impact of most collisions is transmitted to the frame and body. The problem is not solved by the stiffer truck bumpers, and there is an urgent need for shock absorbing bumpers capable of protecting passenger vehicles.

The telescoping shock absorbers normally interposed between the sprung and unsprung masses of a motor vehicle are not suited for connecting a bumper to a vehicle frame. The force with which they oppose movement of the piston inward of the cylinder is a direct function of piston velocity. While a shock absorber of the suspension type would slow initial movement of the bumper toward the vehicle frame, its resistance would decay as the velocity of movement is reduced, and it would become ineffective. A shock absorber of the suspension type is suitable for instantaneous impact only.

It is a primary object of this invention to make the provision of one or more telescoping shock absorbers between the bumper and frame of a vehicle practical for preventing collision damage to the vehicle. A more specific object of the invention is the provision of a vehicle with one or more shock absorbers between the frame and bumper whose resistance to relative movement of bumper and frame remains substantially constant even after reduction of the initial velocity of the bumper relative to the vehicle frame, and of the corresponding velocity of the shock absorber piston inward of the shock absorber cylinder.

The shock absorbers employed for the purposes of the invention share basic structural features of conventional suspension elements, such as the aforementioned piston and cylinder, the cylinder cavity being divided by the piston into two compartments of which at least one is filled with liquid at all times. A restricted passage connects the two compartments for limited liquid flow therebetween, and the energy of the impact is converted to heat in the turbulent liquid.

The means employed for keeping the force opposing the liquid flow substantially constant while the velocity of inward piston movement is being decreased may include a groove in a wall of the cylinder which is swept by the piston during its inward movement. The groove, which constitutes the afore-mentioned restricted passage, has two longitudinally terminal portions which are spaced from each other in the direction of inward piston movement, and its flow section gradually decreases between the terminal portions in the same direction.

Alternatively, the restricted passage may be provided in the piston, and may be provided with a valve spring-biased toward the passage-closing position. The biasing spring imparts the desired characteristics to the shock absorber if it is sufficiently stressed under all operating conditions.

Other features, additional objects, and many of the attendant advantages of this invention will readily become apparent as the same is better understood by reference to the following detailed description of preferred embodiments when considered in connection with the appended drawing in which:

Figures 19, 20:
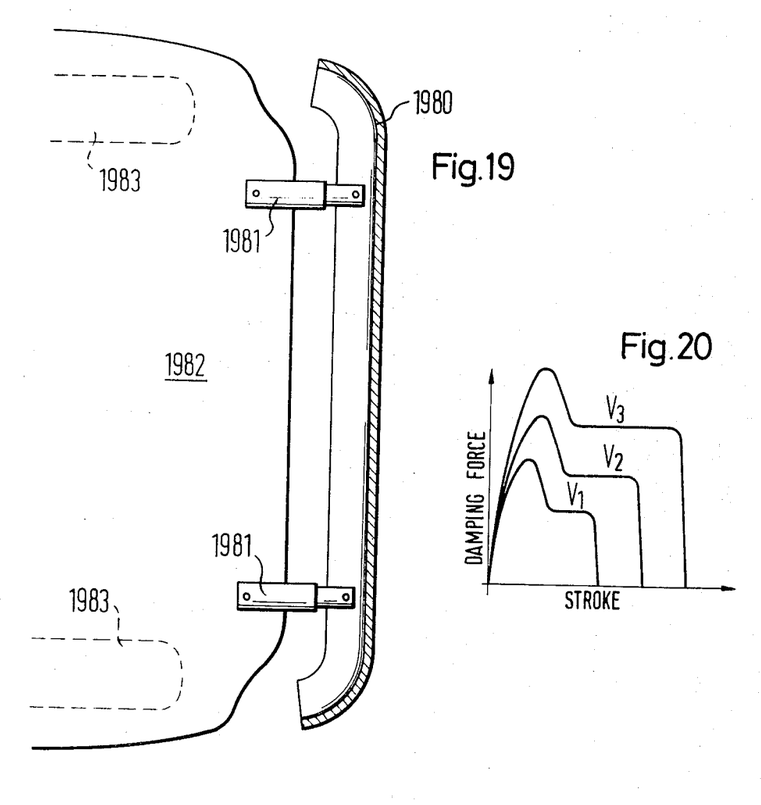
FIG. 19 shows a vehicle equipped with the bumper arrangement of the invention in which the devices of FIGS. 2 to 16 are employed interchangeably, in fragmentary top plan view.
FIG. 20 shows characteristics of a shock absorber of the invention in the manner of FIG. 1.

Referring initially to FIG. 19, there is seen only as much of a passenger automobile as is necessary for an understanding of the invention. The vehicle frame 1982, which normally extends horizontally, is supported by wheels 1983 on a traffic surface, not itself shown. A bumper 1980 of approximate, overall bar shape is offset from the frame 1980 in the direction of vehicle movement for receiving the impact of a collision between the vehicle and another object. Two shock absorbers 1981, spaced along the bar 1980 transversely to the direction of vehicle movement, are interposed between the frame and the bumper bar for damping the impact and transmitting only the damped impact, if any, to the frame.

Figure 1:
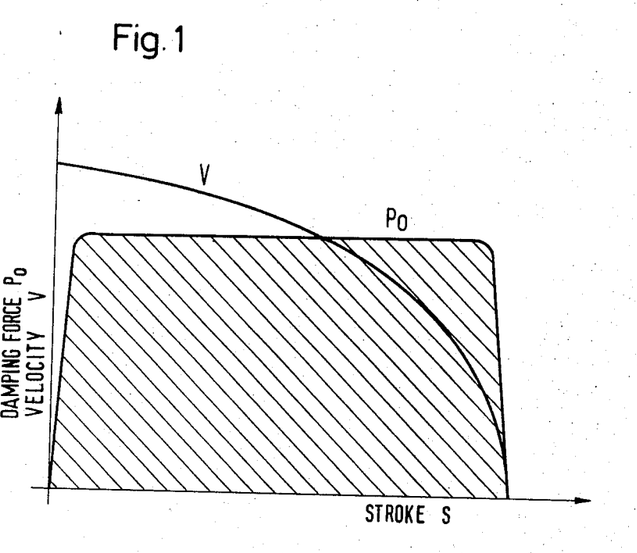
FIG. 1 diagrammatically illustrates the characteristics of a shock absorber in the bumper arrangement of the invention.

The characteristics of the shock absorbers 1981 are graphically represented in FIG. 1 in arbitrary linear units. The curve V represents the velocity at which the piston of each shock absorber 1981 moves inward of the associated cylinder, or the corresponding velocity at which the bumper bar 1980 moves toward the frame 1982, as a function of the stroke or displacement of the piston or bumper bar. The curve $P_o$ represents the damping force with which the shock absorber resists further piston or bumper bar movement as a function of the same bumper bar displacement.

As is evident from FIG. 1, the damping force $P_o$ rapidly rises upon collision impact from a value of zero to a value which is maintained practically constant until the bumper bar or piston velocity is reduced to zero, and then suddenly disappears. The velocity V therefore is reduced initially at a relatively small rate, and the rate of velocity decrease becomes greater as the magnitude of the velocity approaches zero. A shock absorber of the characteristics indicated in FIG. 1 would be as unsuited for the suspension of a motor vehicle as the usual suspension element would be when interposed between the bumper bar 1980 and the frame 1982.

In actual embodiments of the shock absorbers employed in the bumper arrangements of the invention the damping force is preferably between 1,000 and 7,000 kp. An initial piston velocity of 2.2 to 4.4 meters per second (5 to 10 MPH) may be safely reduced to zero. The damping force $P_o$ is almost independent of the energy of impact that is to be absorbed, that is, the mass and velocity of the colliding objects.

Figure 2:
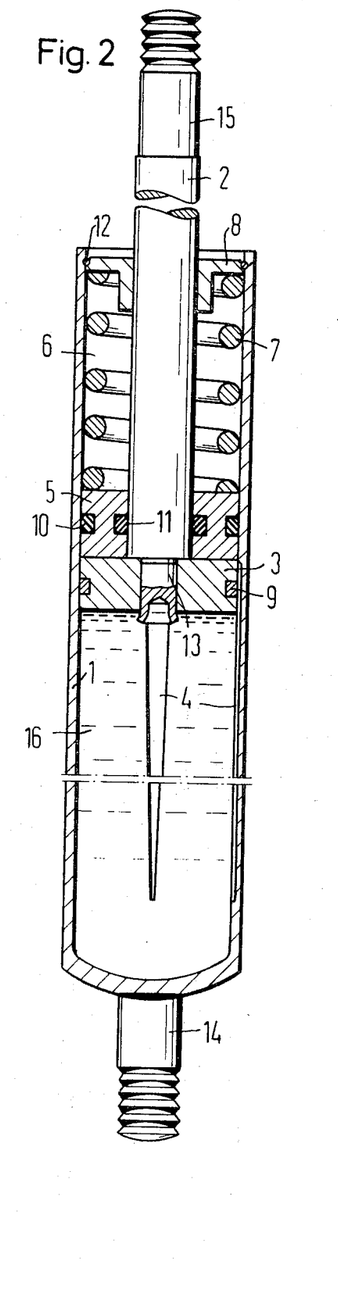
FIGS. 2 to 11 show respective shock absorbers for use in the bumper arrangement of the invention, each view being in section on the common axis of piston and cylinder.

FIG. 2 shows a first example of a shock absorber 1981. It has a cylinder 1 from which a piston rod 2 projects coaxially. The piston 3 attached to a reduced end portion 13 of the rod 2 is guided axially by sliding engagement with the inner wall of the cylinder, and the piston rod 2 is additionally guided in an annular cover 8 which closes one end of the cylinder 1 and is held in position by a retaining ring 12.

An annular sealing piston 5 is located in the cylinder 1 and axially abuts against the piston 3 in the illustrated position while being guided on the piston rod 2 by a sealing ring 11 and on the inner wall of the cylinder 1 by a sealing ring 10. A helical compression spring 7 is coiled loosely about the piston rod between the cover 8 and the sealing piston 5. A sealing ring 9 prevents passage of liquid from the compartment 16 of the cylinder 1 below the piston 3 along the cylindrical wall of the cylinder. Several grooves 4, of which only two are seen in the drawing, extend axially in the inner wall of the cylinder 1. They taper in a downward direction, as viewed in the drawing, and terminate short of the transverse end wall of the cylinder 1. A threaded stud 14 projects axially from the outer face of that end wall and the portion 15 of the piston rod 2 outside the cylinder 1 is similarly threaded for fixed engagement with the frame of the vehicle and the bumper rod illustrated in FIG. 19 in an obvious manner.

The shock absorber shown in FIG. 2 operates as follows:

On impact of an object on the bumper rod, the piston rod 2 is pushed inward of the cylinder 1, and the resulting inward movement of the piston 3 causes liquid from the compartment 16 to travel past the sealing ring 9 in the grooves 4 into another compartment which opens up between the pistons 3 and 5 because of the entry of a portion of the piston rod 2 into the space below the sealing piston 5. The latter is displaced upward by the liquid against the restraint of the spring.

The inward movement of the piston 3 is damped by the restricted flow section of the grooves 4 which are of uniform depth but taper in circumferential width. The force opposing inward movement of the piston rod 3 remains substantially constant although the flow velocity of the liquid decreases as the movement of the piston 3 is slowed. Ultimately, the piston 3 travels beyond the lower end of the grooves 4 and further inward movement of the piston is stopped. FIG. 1 diagrammatically illustrates the relationship between the velocity of the piston 3, the force opposing movement of the piston, and the location of the piston 3 during its downward stroke.

When the forces acting on the bumper bar subside, the spring 7 acting on the sealing piston 5 gradually drives the piston rod 2 out of the compartment, not shown in FIG. 2, between the pistons 5 and 3, and the condition of the apparatus shown in FIG. 2 is restored.

The cylinder space 6 between the sealing piston 5 and the cover 8 in which the spring 7 is received is not sealed from the atmosphere as is not specifically illustrated so that air may enter the space 6 or leave the same without interfering with displacement of the sealing piston 5.

Figure 3:
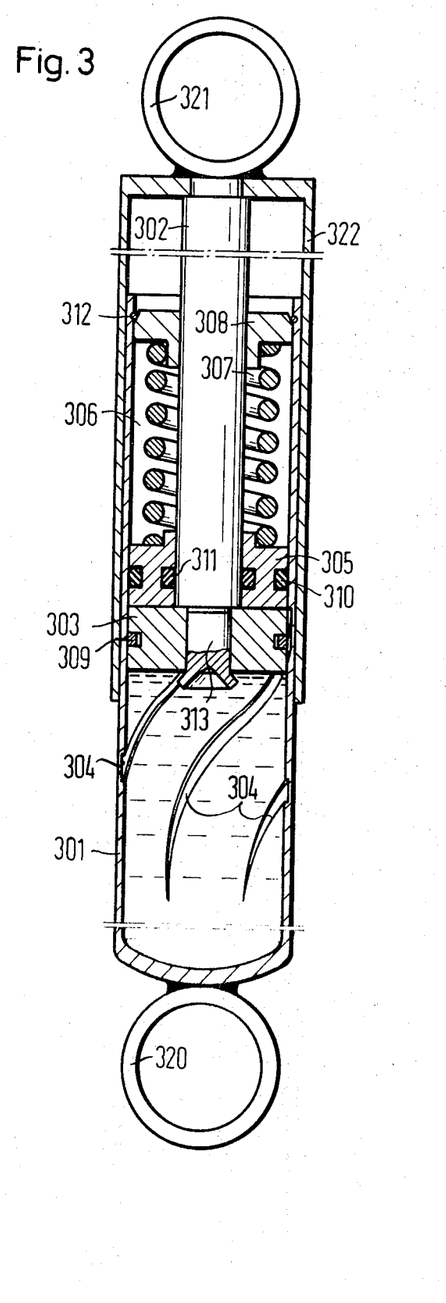

A modification of the shock absorber seen in FIG. 2 is illustrated in FIG. 3, and corresponding or identical elements have been designated by the same reference numerals increased by 300. The cylinder 301 may be attached to the vehicle body by an eye 320 mounted on the fully closed transverse end wall of the cylinder, whereas the piston rod 302 is provided with an analogous eye 321. The piston 303 is not significantly different from that shown in FIG. 2 and is equipped with a sealing ring 309 for preventing liquid from bypassing the piston along the inner wall of the cylinder. The piston 303 is secured on a reduced and initially partly tubular end portion 313 of the piston rod 302 by upsetting the tubular piece of the rod.

In the illustrated rest position of the piston 303, a sealing piston 305 provided with sealing rings 310, 311 for sealing engagement with the cylinder 301 and the cylinder rod 302 is directly superimposed on the piston 303 and held in this position by a helical compression spring 307 interposed between the sealing piston 305 and an annular radial end wall 308 of the cylinder 301 which guides the piston rod 302 and is held in position by a retaining ring 312 without sealing the cylinder space 306 between the sealing piston 305 and the cover 308.

The embodiment of the invention shown in FIG. 3 differs from that illustrated in FIG. 2 by the fastening eyes 320, 321 and also by an outer protective shell 322 having the shape of an inverted cup, as viewed in FIG. 3. The bottom of the cup is fixedly attached to the piston rod 302 where the piston rod joins the eye 321, and the axial wall of the protecting shell 322 slides on the outer wall of the cylinder 301 with some clearance, but in sufficiently close engagement to prevent entry of contaminants into the shock absorber mechanism.

The embodiment of FIG. 3 further differs from that shown in FIG. 2 by the configuration of the grooves 304 in the inner wall of the cylinder 301. While the upper and lower terminal portions of the grooves are spaced in the direction of the cylinder axis, and while each groove tapers gradually from the upper to the lower terminal portion, the groove is not straight between its terminal portions as illustrated in FIG. 2, but extends in an approximate helix along the inner wall of the cylinder 301. The greater length of the groove shown in FIG. 3 permits its longitudinal portions to be modified more precisely to produce a practically linear and constant portion of the curve $P_0$ in the graph of line 1. While all the grooves 304 have been shown to have practically straight converging side walls, they actually deviate somewhat from the straight configuration to an extent not readily illustrated on the scale of the drawing toward an approximately parabolic shape, and some experimentation may be required under specific conditions of operation to establish the precise configuration of the grooves which will best produce the desired response of the shock absorber to the applied impact.

Figure 4:
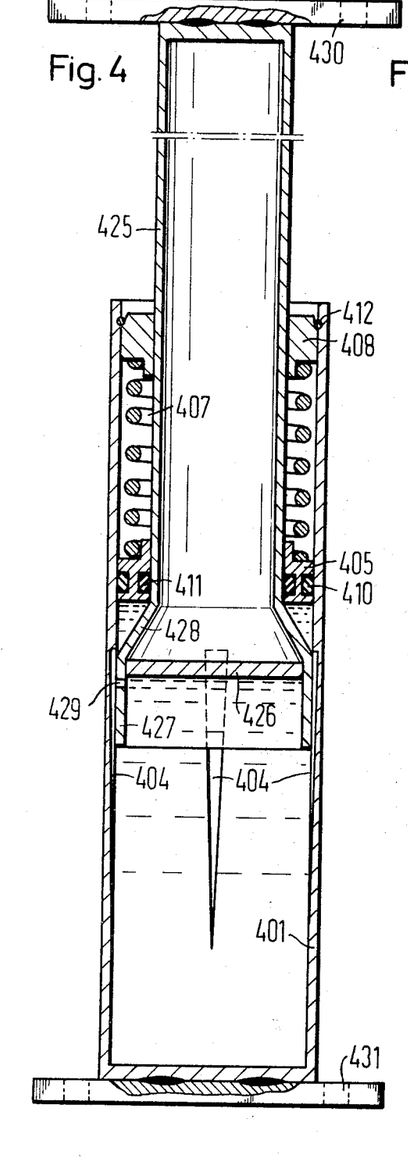

In a further embodiment of the invention illustrated in FIG. 4, the cylinder 401 cooperates with a hollow piston 427 which is integral with a slimmer tubular piston rod 425. The piston rod 425 and the piston 427 are joined by a conically flaring tubular section 428. The interior of the piston rod is sealed from that of the cylinder by a radial plate 426 so that the interior of the hollow piston rod 425 is free from damping liquid. The piston 427 is provided with several radial throttling passages 429 through its wall. Liquid fills the compartment below the piston 427 in the cylinder 401 and an annular space about the conical section 428 between the piston 427 and an annular sealing piston 405 provided with inner and outer sealing rings 410, 411 in a manner evident from the afore-described embodiments.

The sealing piston 405 is biased by a helical compression spring 407 toward the bottom of the cylinder 401 and toward the conical section 428. The spring 407 abuts against the cover 408 which closes but does not seal the top of the cylinder 401, and the pressure of the spring is transmitted by a retaining ring 412 to the cylinder 401.

Flat parallel plates 430, 431 are welded respectively to the ends of the piston rod 425 and the cylinder 401 which are axially remote from each other, and the plates 430, 431 are normally attached to the frame of the vehicle and to the bumper bar respectively by bolts and nuts in a manner not specifically illustrated.

The grooves 404 in the inner wall of the cylinder 401 are closely similar to those shown in FIG. 2. They taper both circumferentially and radially toward their lower ends which are offset upwardly from the lower closed bottom of the cylinder 401.

The tubular piston rod 425 is particularly resistent to bending stresses such as may occur upon oblique impact of an object against the bumper bar of the vehicle. The fastening plates 430, 431 similarly resist such oblique impact.

The shock absorbers shown in FIGS. 3 and 4 operate substantially in the same manner as the shock absorber described above with reference to FIG. 2.

Figure 5:
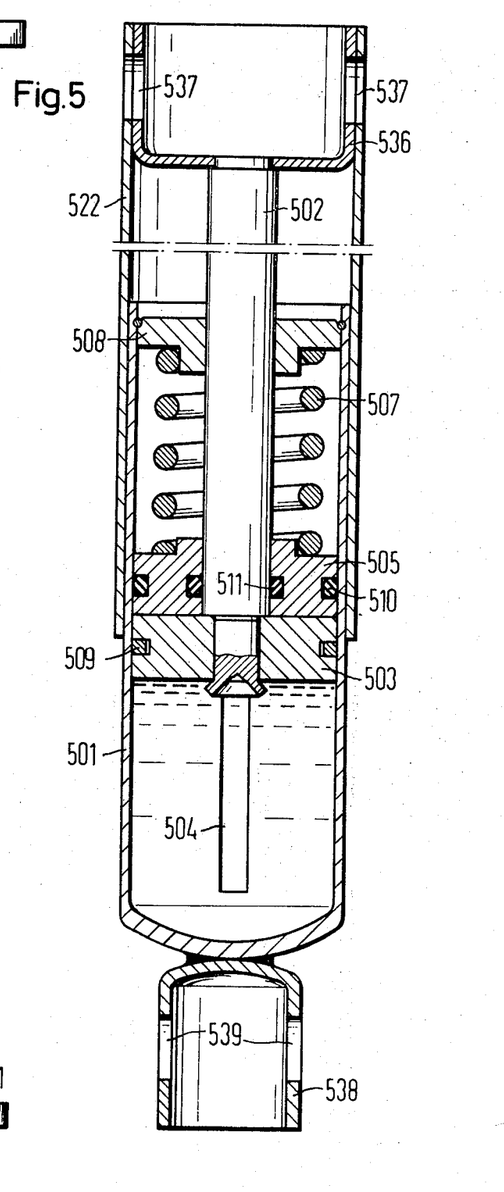

The further shock absorber of the invention illustrated in FIG. 5 differs from that shown in FIG. 3 mainly by the manner in which it is attached to the vehicle frame and the bumper bar and by the configuration of its grooves 504.

The bottom end of the cylinder 501 and the end of the piston rod 502 outside the cylinder cavity respectively carry cup-shaped suspension elements 538, 536 which are formed with respective transverse passages 539, 537 for receiving heavy pins attached to the frame and the bumper bar of the vehicle in an obvious manner, not illustrated. A cylindrical, protective shell 522 is fixedly attached to the suspension element 536 and envelops the outer wall of the cylinder 501 with sufficient clearance to permit free movement while protecting the shock absorber mechanism from external contaminants.

The grooves 504 of which only one is shown in FIG. 5, are rectangular as viewed in FIG. 5 in the direction of the cylinder radius, but taper in depth in a direction away from the cylinder rod 502, the configuration of the bottom of the groove 504 deviating slightly from a plane for the reasons pointed out above.

The shock absorber of FIG. 5 is otherwise closely similar to those described above. The piston 503 is sealed to the inner cylinder wall by a resilient ring 509 and being abuttingly engaged in the illustrated condition of the shock absorber by a sealing piston 505 equipped with inner and outer sealing rings 511, 510 under the biasing force of a helical compression spring 507 backed by an annular cover 508 of the cylinder 501.

Figure 6:
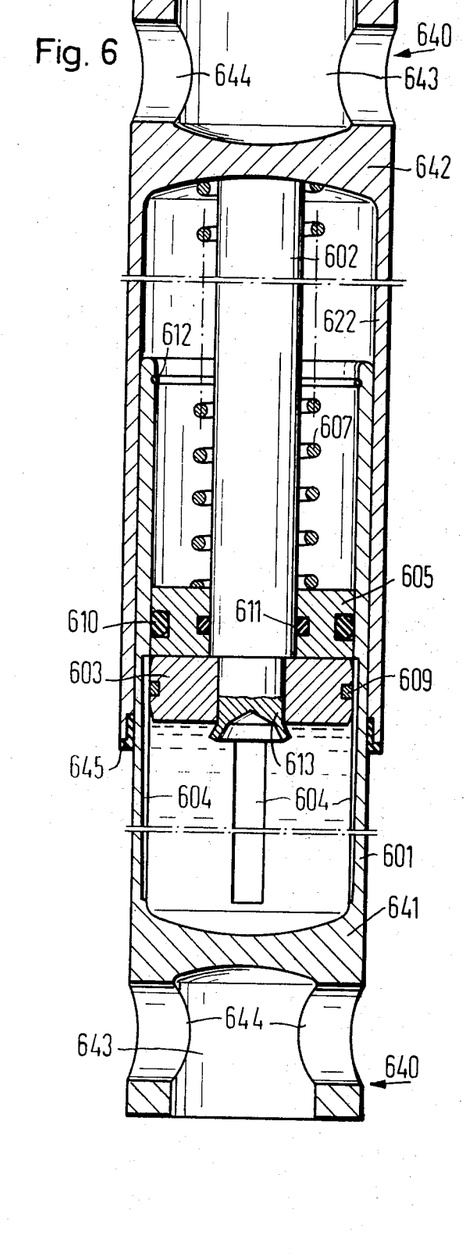

FIG. 6 shows a modification of the shock absorber of FIG. 5 in which the cup-shaped protective shell 622 has a heavy integral bottom 642 from which an equally heavy, integral, tubular attachment 640 projects in an axial direction away from the cylinder 601. The attachment is formed with radial openings 644 communicating with the axial bore 643 of the same for receiving a pin attached to the bumper bar of the vehicle in a manner to prevent damage to the shock absorber under oblique impact of an object against the bumper bar.

The piston rod 602 is fixedly fastened to the transverse wall 642 and carries a piston 603 in the cylinder 601 to which it is sealed by a resilient ring 609. The skirt or open rim of the protective sleeve 622 is provided with an annular gasket 645 slidably engaging the outer wall of the cylinder 601 to prevent even more securely the entry of solid particles into the shock absorber mechanism.

The bottom of the cylinder 601 is a heavy wall 641 integral with a fastening element 640 identical with the attachment 640 described with reference to the protective shell 622. The apparatus is otherwise closely similar to the shock absorbers described with reference to the preceding examples. The bottom end 613 of the piston rod 602 is tubular, passes through a central opening in the piston 603 and is upset to fasten the piston 603 to the piston rod 602.

The mode of operation of the shock absorber shown in FIG. 6 does not differ significantly from that of the devices described above with reference to FIGS. 2 to 5. Its advantages reside in the sturdy suspension arrangement and in the fact that the spring 607 extends beyond the axial length of the cylinder 601, thereby permitting the overall length of the shock absorber to be reduced without loss in function.

Figure 7:
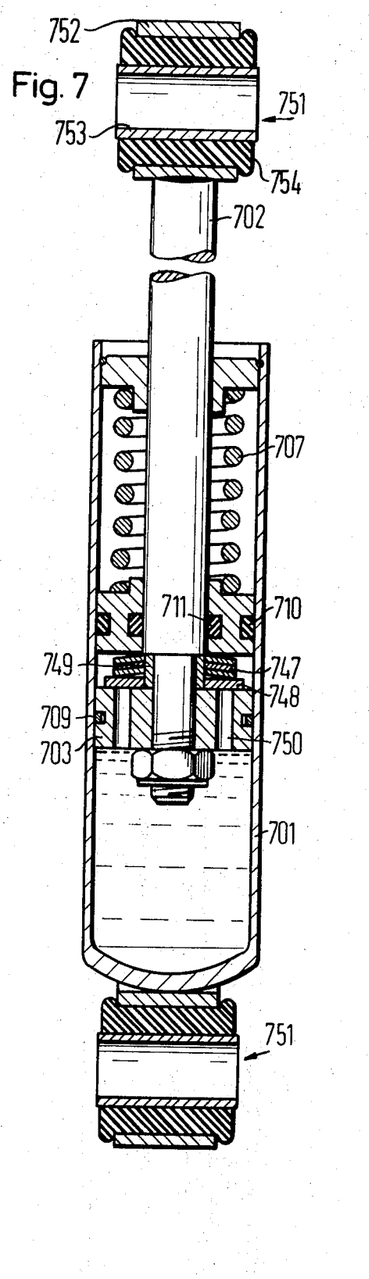

The embodiment of the invention shown in FIG. 7 differs from the shock absorbers described hereinabove by not relying on grooves in the inner wall of its cylinder 701 for restricted throttling passages for the damping liquid. The piston rod 702 carries a piston 703 equipped with a sealing ring 709. The piston is formed with axial bores 750 distributed in a circle about the axis of the piston rod 702 and normally covered by an annular, flat, valve plate 748 under the pressure of annular cup springs 747 strung on a tubular sleeve 749 on the piston rod 702 and axially confined between a shoulder of the piston rod 702 and the valve plate 748.

In the illustrated position of the device, a sealing cylinder provided with sealing rings 710, 711 abuts from above against the sleeve 749 under the force of a helical compression spring 707 interposed between the sealing piston and the annular cover of the cylinder 701 in a manner described more fully with reference to the preceding examples of the invention.

The bottom of the cylinder 701 and the terminal outer portion of the sealing piston rod 702 carry respective eyes 751 each consisting of a cylindrical steel ring 752 welded to the piston rod 702 and the bottom of the cylinder 701 respectively, an inner tube 753 coaxial with the ring 752 and adapted to receive a pin which connects the shock absorber to the bumper bar or the vehicle frame, and an interposed tubular layer 754 of elastomeric material which itself is capable of absorbing some of the impact of a collision and prevent damage to the shock absorber by transverse stresses due to an oblique impact.

The shock absorber illustrated in FIG. 7 operates as follows:

Upon impact of an object against the bumper bar, the piston rod 702 is driven inward of the cylinder 701, whereby the valve plate 748 is lifted from the orifices of the bore 750 against the restraint of the cup springs 747. The springs are prestressed in such a manner that they provide characteristics of the shock absorber analogous to those shown in FIG. 1, that is, the valve opens quickly and is held open regardless of the velocity of impact and mass of the colliding objects so that a damping diagramm similar to that shown in FIG. 1 is achieved and maximum absorption of the impact energy in the shock absorber is ensured. The damping force is constant throughout the entire movement of the piston 703 inward of the cylinder 701. The valve plate 748 seals the valve bores 750 only after the impact has subsided, and the piston rod 702 is then returned to its illustrated starting position by the spring 707. The return is relatively slow because it relies on leakage flow of liquid to the bottom compartment of the cylinder 701 past the valve plate 748 and the sealing ring 709 of the piston 703. However, two immediately successive collisions need not to be considered, and the period of return of the piston 703 to its illustrated position is completed long before the next impact. The function and operation of the valve arrangement in the piston 703 will be described in more detail hereinbelow with reference to further embodiments.

Figure 8:
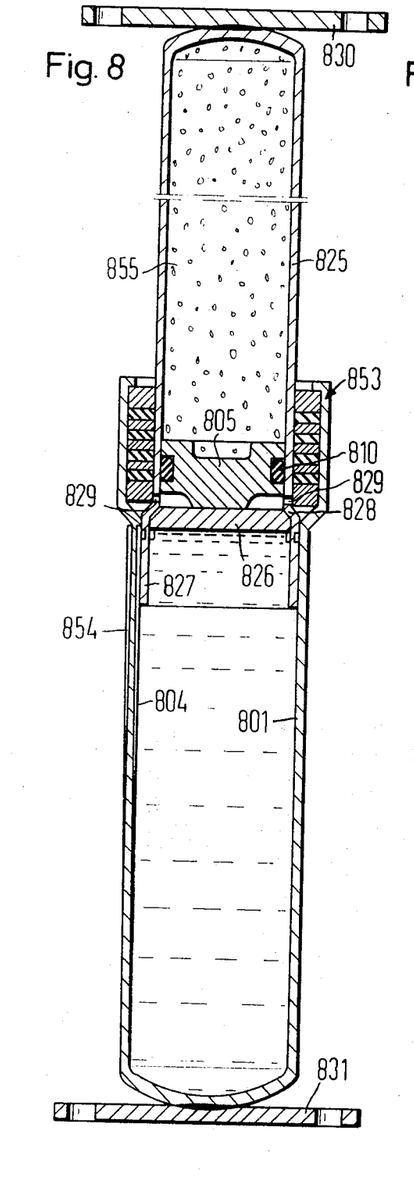

The shock absorber shown in FIG. 8 has a cylinder 801 whose inner wall is formed with grooves 804 which taper in a downward direction and are formed by rolling the relatively thin cylinder walls so that each groove 804 on the inner wall corresponds to a rib 854 on the outer wall. The upper end of the cylinder 801 is enlarged to accomodate an annular sealing arrangement 853 for a tubular piston rod 825. The piston rod flares conically, as shown at 828, inward of the cylinder 801 to form a cylindrical, hollow piston 827 which sealingly engages the inner cylinder wall.

A plate 826 is axially secured in the conically tapering portion 828 of the integral piston and piston rod to seal an air cushion in a space 855 in the piston rod from the liquid-filled compartment of the cylinder 801 below the piston 827. A sealing piston 805 provided with an external sealing ring 810 is axially slidable in the piston rod 825 and is biased towards toward the plate 826 by the compressed air in the hollow interior 855 of the piston rod. As the piston 827 moves inward of the cylinder 801 upon impact against the piston rod 825, liquid may flow past the cylinder in the grooves 804 and thereafter enter the compartment opening in the piston rod 825 between the sealing piston 805 and the plate 826 through radial bores 829 in the piston rod.

Plates 830, 831 are respectively welded to the imperforate transverse walls of the piston rod 825 and of the cylinder 801 and may be bolted to the vehicle frame and the bumper bar. The mode of operation of the device shown in FIG. 8 will be obvious from the description of other embodiments. The cushion of compressed air in the piston rod 825 is analogous in its function to the several helical compression springs indicated above. The pressure of the air restores the illustrated normal condition of the shock absorber after the impact of a collision subsides.

Figure 9:
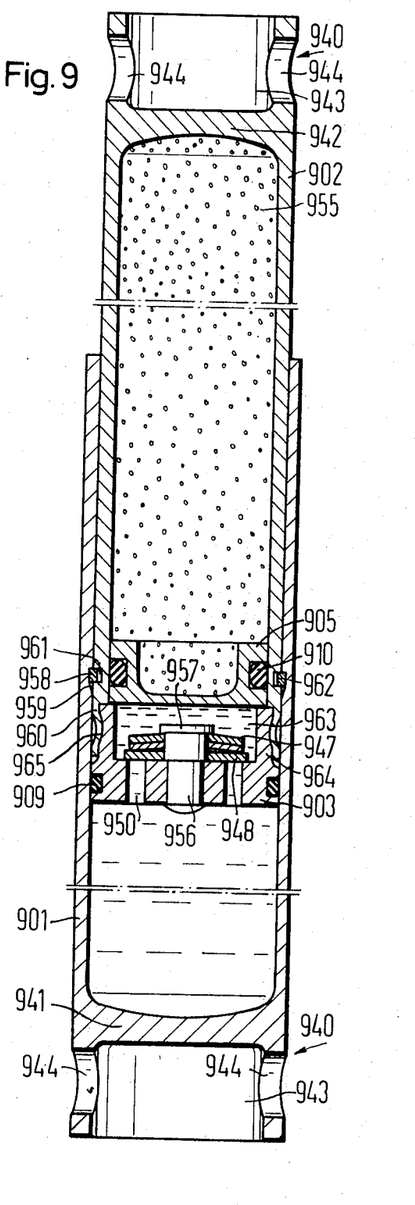

The shock absorber shown in FIG. 9 combines features of several afore-described embodiments. The cylinder 901 has a heavy bottom wall 941 common to a cup-shaped attachment 940 formed with an axially open cavity 943 communicating with radial bores 944 for receiving a fastening pin. The non-illustrated pin preferably passes through a bore in a heavy projection on the vehicle frame 1982. The hollow piston rod 902 similarly has a heavy transverse wall 942 and is integral with an attachment 940 substantially identical with that described above for connection with a projection on the bumper bar 1980. The piston rod 902 encloses a cushion 955 of compressed air which tends to drive a sealing piston 905 outward of the piston rod in a downward direction, the sealing piston being provided with an outer sealing ring 910 engaging the inner wall of the cylinder rod and thereby separating compressed air in the piston rod from the damping liquid filling the remainder of the cylinder 901.

The rim portion 960 of the piston rod 902 remote from the transverse wall 942 is of reduced thickness so as to receive a tubular, axial projection 964 of a piston 903. The piston 903 and piston rod 902 are fixedly connected by interengaged annular projections and recesses 965 on the rim portion 960 and the projection 964. The latter projects radially inward beyond the main wall portion of the piston rod 902 to provide an abutment limiting axial movement of the sealing piston 905.

The projection 964 radially bounds a chamber 963 which is filled with liquid at all times and is axially bounded by the sealing piston 905 in the illustrated position of the latter. A valve plate 948 and cup springs 947 are axially movably mounted on a shoulder rivet 956 projecting from the piston 903 into the chamber 963, and are axially secured to the piston by an enlarged head 957 of the rivet. The valve plate 948 practically seals orifices of straight axial bores 950 in the piston 903, and passage of liquid between the chamber 963 and the cylinder compartment under the piston 903 along the inner wall of the cylinder 901 is reduced to a trickle leakage at most by a sealing ring 909 on the piston 903.

Movement of the piston rod 902 outward of the cylinder 901 from the illustrated position is prevented by a split ring 962 of spring temper metal which, in the illustrated position, is partly received in a conforming groove 961 of the piston 903 and a groove 958 of the cylinder 901. When the piston 902 moves inward of the cylinder 901 from the illustrated position, the ring 962 is compressed by a conically oblique wall 959 of the groove 958 and completely received in the groove 961 of the piston rod.

The several elements of the shock absorber of FIG. 9 operate as described with respect to analogous elements in the afore-described devices.

The shock absorbers shown in FIGS. 2 to 9 have been described in elevational section, that is, with their axes arranged vertical, whereas the shock absorbers 1981 in FIG. 19 are shown to have horizontal axes. The mode of operation of the afore-described shock absorbers, however, is independent of their orientation in space, and they have been described as if they were upright for the sake of convenience.

Figure 10:
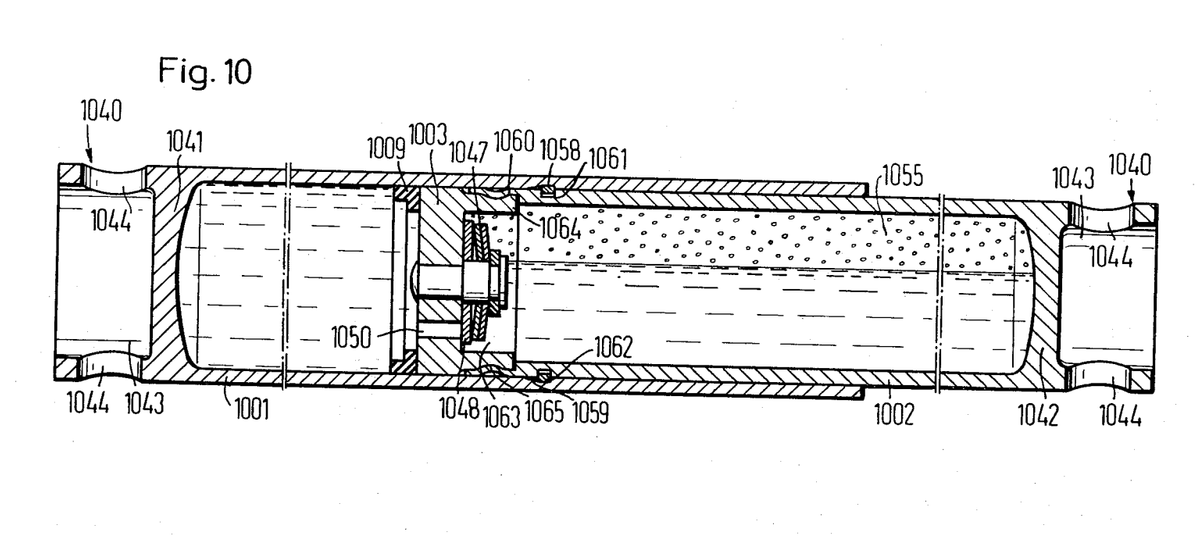

The shock absorber illustrated in FIG. 10 relies for operativeness on an at least approximately horizontal orientation of its axis, and is illustrated accordingly. In its illustrated position, it does not requrie a sealing piston separating the damping liquid from a gas cushion which tends to drive the piston and piston rod outward of the cylinder, and thus to restore the starting position of the shock absorber after impact.

The cylinder 1001 and the hollow piston rod 1002 carry respective cup-shaped attachments 1040 respectively integral with transverse end walls 1041, 1042 of the cylinder and piston rod as described with reference to FIGS. 6 and 9. Transverse passages 1044 communicating with a central, axially open cavity 1043 in each attachment normally receive a fastening pin, as described above. A piston 1003 provided with a tubular axial extension 1064 is secured to the reduced rim portion 1060 of the piston rod 1002 by interengaged annular grooves and projections 1065 as described with reference to FIG. 9, and the extension 1064 defines a chamber 1063 which is open toward the interior of the piston rod 1002 and the cushion 1055 of compressed air partly filling the hollow piston rod, the lower portion of the piston rod cavity being occupied by damping liquid.

Movement of the piston rod 1002 outward of the cylinder 1001 from the illustrated position is prevented by a split ring 1062 of spring metal cooperating with a groove 1061 in the piston rod 1002 and a groove 1058 in the cylinder 1001, the latter groove having a conical wall 1059 for the purpose evident from the description of FIG. 9.

A shoulder rivet projecting centrally into the chamber 1063 from the piston 1003 holds an annular valve plate 1048 and cup springs 1047 as described above.

The axial bores 1050 in the piston 1003 which are controlled by the annular valve plate 1048 are located only in the portion of the piston 1003 well below the cylinder axis so that they cannot communicate with the air cushion 1055 in any operative position of the shock absorber. The piston 1003 is sealed to the cylinder wall by a sealing ring 1009 of L-shaped cross section which is attached to the radial face of the piston remote from the piston rod 1003 in the compartment of the cylinder 1001 which is completely filled with liquid at all times.

Except for the limitation to an approximately horizontal axis and the resulting elimination of the sealing piston, the shock absorber of FIG. 10 is the structural and functional equivalent of that described with reference to FIG. 9, and does not require more detailed description of its mode of operation.

Figure 11:
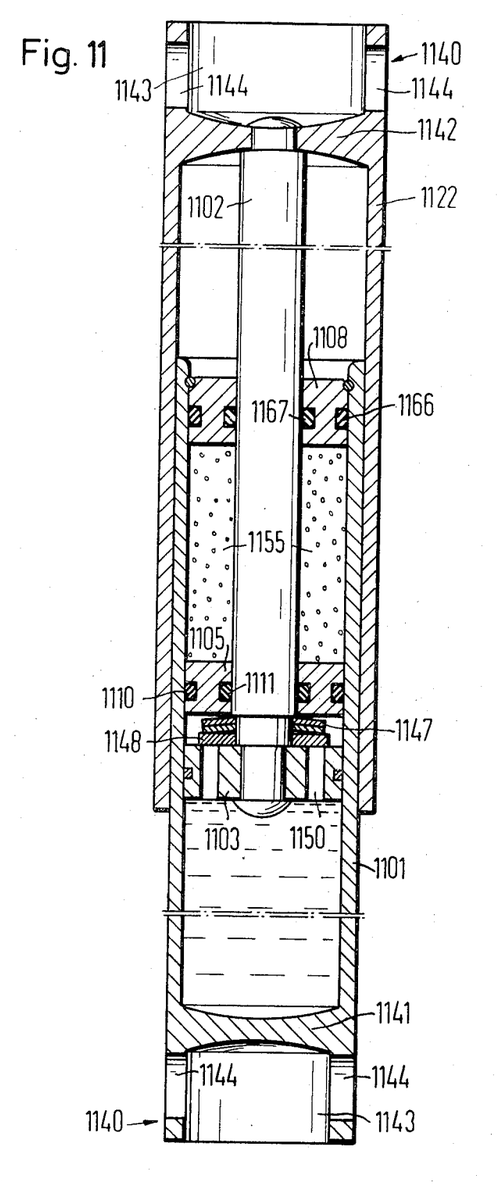

The shock absorber illustrated in FIG. 11 is capable of operating in any position, and will therefore be described, for the sake of convenience, as if it were illustrated in elevational section. It has a cylinder 1101 whose imperforate transverse end wall 1141 also forms the bottom wall of a cup-shaped attachment 1140 integral with the cylinder 1101, the attachment being formed with an axially open cavity 1143 and radial bores 1144 communicating with the cavity and adapted to receive a fastening pin, as described above.

An identical attachment 1140 is integral with a protecting shell 1122 which slidably covers the cylinder 1101 to prevent contamination of the shock absorber mechanism. The transverse wall 1142 of the shell 1122 is fixedly attached to the outer end of a piston rod 1102 whose inner end carries a piston 1103 in the cylinder 1101. The top of the cylinder 1101 is closed by an annular cover 1108 sealed to the cylinder 1101 and the piston rod 1102 respectively by resilient rings 1166, 1167.

An annular sealing piston 1105 is similarly sealed to the cylinder and the piston rod by rings 1110, 1111. A cushion 1155 of compressed air between the cover 1108 and the sealing piston 1105 holds the cover against a retaining ring on the inner wall of the cylinder 1101, and holds the sealing piston 1105 against annular cup springs 1147 secured on a reduced portion of the piston rod 1102 between a shoulder of the piston rod and an annular valve plate 1148 engaging the radial top surface of the piston 1103. The valve plate 1148, in its illustrated position, closes axial bores 1150 in the piston 1103.

Upon impact, the piston 1103 moves inward of the compartment at the bottom of the cylinder 1101, and the displaced oil or other liquid is expelled through the bores 1150 to lift the valve plate 1148 against the abruptly decreasing restraint of the cup springs 1147, and to shift the sealing piston 1105 to compress the air cushion 1155. After the impact, the pressure of the gas cushion 1155 causes gradual leakage of the liquid past the piston 1103 until the illustrated condition is restored.

FIGS. 12 to 16 show the bumper arrangement of FIG. 19 equipped with shock absorbers of the type illustrated in FIG. 11, the valves of the shock absorbers being further modified. Only the modified valves and immediately cooperating elements are shown in FIGS. 12 to 16.

Figure 12:
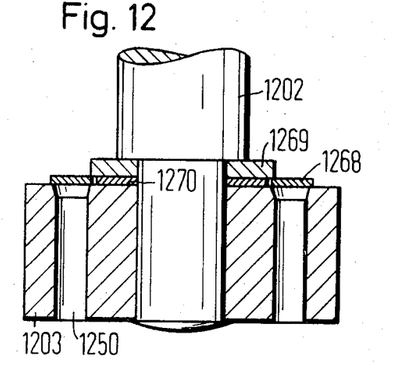
FIGS. 12 to 16 illustrate modified valve arrangements for use in the shock absorber of FIG. 11.

In the valve shown in FIG. 12, passages 1250 in a piston 1203 are normally held closed by an annular cup spring 1268 sufficiently prestressed that it is practically flat. The spring 1268 is axially held in its prestressed condition between the radial top surface of the piston 1203 and a rigid washer 1269 backed by a shoulder on the piston rod 1202. The central opening of the spring 1268 is much greater than the cross section of the reduced piston rod portion passing through the spring 1202, and the spring is centered with respect to the piston rod by a flat spacer ring 1270. The inner edge of the spring 1268 is thus confined in a circular groove and prevented from assuming the relaxed position in which the spring 1268 would conically taper in an upward direction, as viewed in FIG. 12, that is, away from the piston 1203.

Figure 13:
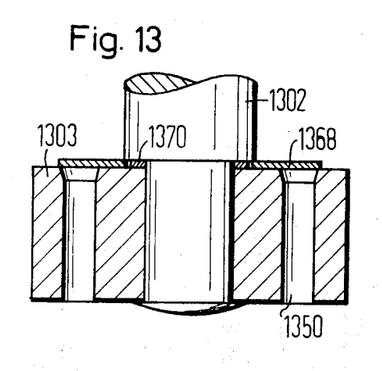

The valve arrangement shown in FIG. 13 is identical with that described above with reference to FIG. 12 except for some dimensions and the omission of a washer on a piston rod shoulder. The passages 1350 in the piston 1303 illustrated in FIG. 13 are normally held closed by a valve plate 1368 which is an annular cup spring held in a flattened condition between a shoulder of the piston rod 1302 and the radial top surface of the piston. A spacer ring 1370 between the shoulder and the piston surface holds the spring 1368 centered relative to the common axis of the piston 1303, the piston rod 1302, and the associated cylinder and outer shell, not themselves shown in FIG. 13.

Figure 14:
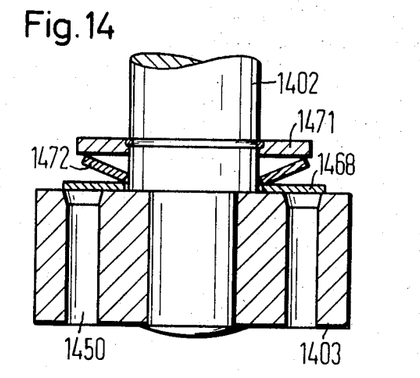

FIG. 14 shows an additional valve arrangement in which passages 1450 in a piston 1403 are normally held closed by a flattened cup spring 1468 closely similar to the afore-described springs 1268, 1368. The central opening in the spring 1468 is dimensioned for a sliding fit on the reduced portion of a piston rod 1402. The inner, circular edge of the spring 1468 is prevented from moving away from the piston 1403 and into its relaxed position by a second annular cup spring 1472, much stronger than the spring 1468, and slidable on the reduced piston rod section. The second spring 1472 is in a condition not significantly different from its relaxed condition in which the spring 1472 assumes the illustrated frustoconical shape tapering toward the piston 1403, so that the smaller base of the frustum engages the inner rim of the spring 1468. The spring 1472 is axially secured by a collar 1471 welded to the piston rod 1402.

Figure 15:
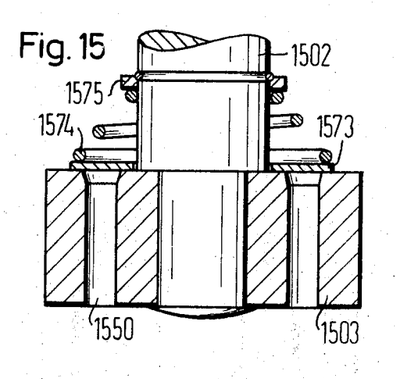

In the valve arrangement seen in FIG. 15, passages 1550 in a piston 1503 are held closed by a flat, rigid, annular valve plate 1573 axially slidable on the piston rod 1502 under the biasing force of a wire spring 1574 having the shape of a conical helix in the relaxed condition. The spring 1574 is held under compressive stress between the plate 1573 engaging its wider base and a collar 1575 welded to the piston rod 1502 and engaging its narrow base.

Figure 16:
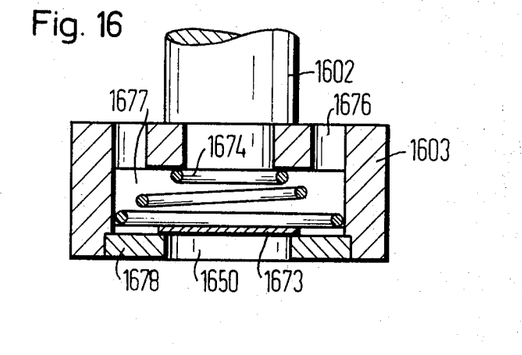

The piston 1603 shown in FIG. 16 encloses a cavity 1677 which communicates with the annular cylinder compartment about the piston rod 1602 through permanently open throttling passages 1676. A rigid ring 1678 downwardly bounds the cavity 1677 and is formed with a relatively large, single, central aperture 1650 sealed in the illustrated position by a rigid valve disc 1673. The valve disc is pressed against the annular face of the ring 1678 by a helical compression spring 1674 similar to the afore-described spring 1574.

The several valve arrangements seen in FIGS. 12 to 16 are intended to replace the corresponding valve arrangement illustrated in FIG. 11, and are thus parts of shock absorbers, not otherwise shown, which are identical with the device illustrated in FIG. 11 as far as not explicitly shown and described.

Figure 17:
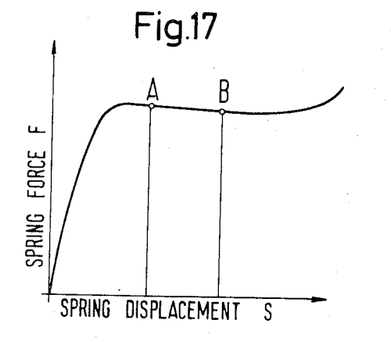
FIGS. 17 and 18 diagrammatically illustrate the characteristics of valve springs employed in the arrangements of FIGS. 11 to 16.
Figure 18:
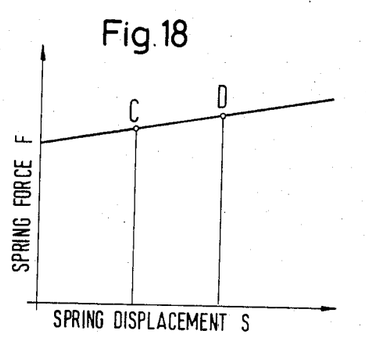

FIGS. 17 and 18 show typical respective characteristic curves of a cup spring and of a helical spring in a valve arrangement of the invention, the curve illustrating the relationship of spring force F v. spring displacement or spring deformation S in arbitrary, linear units. FIG. 17 thus illustrates the response of springs in FIGS. 11 to 14 to stresses applied by the hydraulic fluid discharged through piston passages. The several cup springs are prestressed in such a manner that their deformation from the fully closed to the fully open valve position is encompassed by the section A − B of the characteristic curve which is practically parallel to the abscissa denoting spring displacement or deformation and practically constant spring stress.

As is evident from the characteristic curve of FIG. 17, the flow characteristics of a restricted passage controlled by a cup spring are independent of the flow velocity and also of the viscosity of the liquid, that is, its temperature. The desired rectangular characteristic line of the bumper arrangement (FIG. 1) is thus maintained regardless of ambient temperature. This insensitivity to temperature variations is not available with the embodiments of the invention in which the restricted damping passage is constituted by a groove whose flow section decreases as the damping piston moves inward of the shock absorber piston.

The characteristic line of a helical compression spring of the type shown in FIGS. 15 and 16 has a very small slope in its operating range C − D, and this is achieved by severely prestressing the spring even in the most relaxed condition which it may assume in the valve arrangement and which is illustrated in FIGS. 15 and 16 respectively. FIG. 20 shows the damping force as a function of the stroke S in a shock absorber of the type illustrated for example in FIG. 7. The passages 750 are relatively small so that they influence the characteristics. The curves $V_1$, $V_2$, $V_3$ correspond to different initial impact velocities. The damping force is determined by the cross-section of passages 750 as long as this cross-section is smaller than the flow section defined by the valve plate 748. As long as this is the case the damping force is defined by the upwardly convex curve portions in FIG. 20. When the flow section defined by the valve plate 748 becomes smaller than that of the passages 750, the flow is only influenced by the valve plate 748. This condition corresponds to the horizontal sections of the curves in FIG. 20.

What is claimed is:

1. In a vehicle including a normally horizontally extending vehicle frame, supporting means for supporting said frame on a traffic surface for movement in a predetermined direction, bumper means offset from said frame in said direction for receiving the impact of a collision between said vehicle and another object, and shock absorbing means interposed between said frame and said bumper means for damping said impact and for transmitting the damped impact to said frame, said shock absorbing means including at least one telescoping shock absorber having a cylinder member bounding a cavity therein, a piston movably received in said cavity and dividing the same into two compartments, a liquid filling at least one of said compartments and a gas occupying a portion of the other compartment, said piston being formed with a restricted passage connecting said compartments, a piston rod member fixedly fastened to said piston and extending through said other compartment and outward of said cylinder member, and fastening means respectively fastening said members of said at least one shock absorber to said bumper means and to said frame for movement of said piston rod member inward of said cylinder member in response to said impact, whereby a damping force is exerted by said liquid on said piston member while said liquid flows through said passage from said one compartment into said other compartment during said inward movement of the piston rod member, the improvement in said shock absorber which comprises:
   a. first resilient means in the other one of said compartments for urging said liquid from said other compartment into said one compartment and thereby biasing said piston rod member outward of said cylinder member;
   b. valve means movable relative to said piston member toward and away from a passage closing position,
      1. said valve means being urged away from said position thereof by liquid flowing from said one compartment to said other compartment through said passage and preventing liquid flow between said compartments when in said position;
   c. second resilient means biasing said valve means toward said position; and
   d. abutment means engaging said resilient means and holding the same under stress in all operative positions of said valve means,
      1. said stress being sufficient to make the damping force exerted by said liquid on said piston rod member substantially independent from changes in the velocity of said piston rod member during said inward movement of the piston rod member.

2. In a vehicle as set forth in claim 1, said bumper means including a bar member elongated transversely of said direction, and said shock absorbing means including two of said shock absorbers spaced along said bar member.

3. In a vehicle as set forth in claim 1, said fastening means including a fastening member attached to said piston rod member outside said cavity, and a protective outer shell fixedly attached to said fastening member, said shell enveloping respective portions of said piston rod member and of said cylinder member and slidably engaging an outer axial surface of said cylinder member.

4. In a vehicle as set forth in claim 1, said first resilient means including a cushion of gas under pressure higher than atmospheric pressure.

5. In a vehicle as set forth in claim 1, said second resilient means including a cup spring engaged by said abutment means and held thereby under a stress to make the spring force approximately uniform during the movement of said valve means toward and away from said position of the latter.

6. In a vehicle as set forth in claim 5, the flow section of said passage being sufficient to make said damping force substantially independent of the initial velocity of said piston member during said movement thereof relative to said cylinder member.

7. In a vehicle as set forth in claim 1, said second resilient means including a helical compression spring engaged by said abutment means and held thereby under a stress to make the change in the force of said spring during the movement of said valve means toward and away from said position of the latter a very small fraction of said stress.

* * * * *